(12) United States Patent
Sono et al.

(10) Patent No.: US 11,402,259 B2
(45) Date of Patent: Aug. 2, 2022

(54) INFRARED SENSING DEVICE

(71) Applicant: PANASONIC INTELLECTUAL PROPERTY MANAGEMENT CO., LTD., Osaka (JP)

(72) Inventors: Takahiro Sono, Shiga (JP); Ryo Taniguchi, Osaka (JP); Sukoya Tawaratsumida, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 17/044,985

(22) PCT Filed: Mar. 26, 2019

(86) PCT No.: PCT/JP2019/012978
§ 371 (c)(1),
(2) Date: Oct. 2, 2020

(87) PCT Pub. No.: WO2019/194031
PCT Pub. Date: Oct. 10, 2019

(65) Prior Publication Data
US 2021/0025752 A1    Jan. 28, 2021

(30) Foreign Application Priority Data
Apr. 4, 2018   (JP) .............................. JP2018-072771

(51) Int. Cl.
*G01J 1/04*   (2006.01)
*G02B 3/00*   (2006.01)
(Continued)

(52) U.S. Cl.
CPC ........... *G01J 1/0411* (2013.01); *G01J 1/0271* (2013.01); *G01J 1/46* (2013.01); *G02B 3/0037* (2013.01); *G02B 3/08* (2013.01)

(58) Field of Classification Search
CPC .......... G02B 3/02; G02B 3/08; G02B 3/0068; G02B 3/0062; G02B 3/0056;
(Continued)

(56) References Cited

U.S. PATENT DOCUMENTS 4,679,912 A   7/1987 Loy
6,353,588 B1   3/2002 Ori
(Continued)

FOREIGN PATENT DOCUMENTS

CN   107678146 A   2/2018
EP   1847822 A1   10/2007
(Continued)

OTHER PUBLICATIONS

10 Pencil of Rays, Aplanatic point. 0 plus E, Aug. 2013, vol. 35, No. 8, pp. 906-913; with English Translation.
(Continued)

*Primary Examiner* — John R Lee
(74) *Attorney, Agent, or Firm* — McDermott Will & Emery LLP

(57) ABSTRACT

A meniscus lens has a dome shape and has a first surface facing a lens array and a second surface facing an infrared sensing element. The meniscus lens has a central portion and a peripheral portion. The central portion includes a top point that is an intersection between the optical axis of the meniscus lens and the first surface. The peripheral portion includes an end of the first surface of the meniscus lens. With respect to the central portion of the meniscus lens, an aplanatic point of the first surface is located at the focus of the lens array. With respect to the peripheral portion of the meniscus lens, an aplanatic point of the second surface is located at the focus of the lens array.

20 Claims, 14 Drawing Sheets

(51) Int. Cl.
*G02B 3/08* (2006.01)
*G01J 1/02* (2006.01)
*G01J 1/46* (2006.01)

(58) Field of Classification Search
CPC ....... G02B 3/0006; G02B 3/0037; G01J 1/44;
G01J 1/46; G01J 1/0271; G01J 1/0407;
G01J 1/0411
See application file for complete search history.

(56) References Cited

U.S. PATENT DOCUMENTS

| | | | | |
|---|---|---|---|---|
| 7,528,880 | B2 * | 5/2009 | Yamaguchi | G02B 13/0025 |
| | | | | 348/340 |
| 7,602,560 | B2 * | 10/2009 | Kawasaki | G02B 13/0035 |
| | | | | 359/811 |
| D623,547 | S * | 9/2010 | Nishikawa | D10/106.6 |
| 8,444,331 | B2 * | 5/2013 | Kobayashi | G03B 17/12 |
| | | | | 257/433 |
| 9,000,378 | B2 * | 4/2015 | Oi | G01J 1/0266 |
| | | | | 250/353 |
| 9,395,237 | B2 * | 7/2016 | Choi | G01J 1/0437 |
| 9,453,945 | B2 * | 9/2016 | Jang | G01J 5/0806 |
| 9,587,978 | B2 * | 3/2017 | Okudo | G01J 1/0411 |
| 9,618,660 | B2 * | 4/2017 | Fujimura | G02B 13/14 |
| 9,632,291 | B2 * | 4/2017 | Saito | G02B 3/08 |
| 9,720,213 | B2 * | 8/2017 | Kamitakahara | G02B 13/0035 |
| D885,946 | S * | 6/2020 | Sono | D10/70 |
| 2013/0144563 | A1 * | 6/2013 | Naumann | G01J 5/0803 |
| | | | | 250/208.2 |
| 2014/0285671 | A1 * | 9/2014 | Ishii | H04N 5/33 |
| | | | | 348/164 |
| 2021/0025752 | A1 * | 1/2021 | Sono | G01J 5/34 |

FOREIGN PATENT DOCUMENTS

| | | |
|---|---|---|
| JP | S47-016183 A | 8/1972 |
| JP | S59-116608 A | 7/1984 |
| JP | 2000-180717 A | 6/2000 |
| JP | 2001-272274 A | 10/2001 |
| JP | 2008-216765 A | 9/2008 |
| JP | 2013-044595 A | 3/2013 |
| JP | 2015-194400 A | 11/2015 |
| JP | 2016-170041 A | 9/2016 |
| WO | 2015/151388 A1 | 10/2015 |

OTHER PUBLICATIONS

International Search Report and Written Opinion issued in International Patent Application No. PCT/JP2019/012978, dated Jun. 11, 2019; with partial English translation.

\* cited by examiner

INFRARED SENSING DEVICE

CROSS-REFERENCE OF RELATED APPLICATIONS

This application is the U.S. National Phase under 35 U.S.C. § 371 of International Patent Application No. PCT/JP2019/012978, filed on Mar. 26, 2019, which in turn claims the benefit of Japanese Application No. 2018-072771, filed on Apr. 4, 2018, the entire disclosures of which Applications are incorporated by reference herein.

TECHNICAL FIELD

The present invention generally relates to an infrared sensing device, and more particularly relates to an infrared sensing device including a lens array and an infrared sensing element.

BACKGROUND ART

An infrared sensor (infrared sensing device) including an infrared detection element (infrared sensing element), a lens array, and an optical member has been known in the art (see, for example, Patent Literature 1).

The optical member includes a reflective piece with a pair of mirror surfaces and a supporting portion to support the reflective piece.

In the infrared sensor of Patent Literature 1, however, part of an infrared ray transmitted through the lens array and directly traveling toward the infrared sensing element is cut off by the reflective piece, thus causing a decline in sensitivity.

CITATION LIST

Patent Literature

Patent Literature 1: JP 2015-194400 A

SUMMARY OF INVENTION

An object of the present invention is to provide an infrared sensing device with the ability to curb a decline in sensitivity while broadening the sensing area.

An infrared sensing device according to an aspect of the present invention includes an infrared sensing element, a lens array, and a meniscus lens. The lens array includes multiple lenses. The lens array is arranged to intersect with an optical axis of the infrared sensing element. The lens array has a focus on the same side as the infrared sensing element. The meniscus lens has a dome shape and is arranged between the lens array and the infrared sensing element. The meniscus lens has a first surface facing the lens array and a second surface facing the infrared sensing element. The meniscus lens has a central portion and a peripheral portion. The central portion includes: a top point that is an intersection between the optical axis of the meniscus lens and the first surface; and an intersection between the optical axis of the meniscus lens and the second surface. The peripheral portion includes an end of the first surface of the meniscus lens and an end of the second surface of the meniscus lens. With respect to the central portion of the meniscus lens, an aplanatic point of the first surface is located at the focus of the lens array. With respect to the peripheral portion of the meniscus lens, an aplanatic point of the second surface is located at the focus of the lens array.

DESCRIPTION OF EMBODIMENTS

First Embodiment (1) Overall Configuration for Infrared Sensing Device

An infrared sensing device 1 according to a first embodiment will now be described with reference to the accompanying drawings.

Figure 6A:
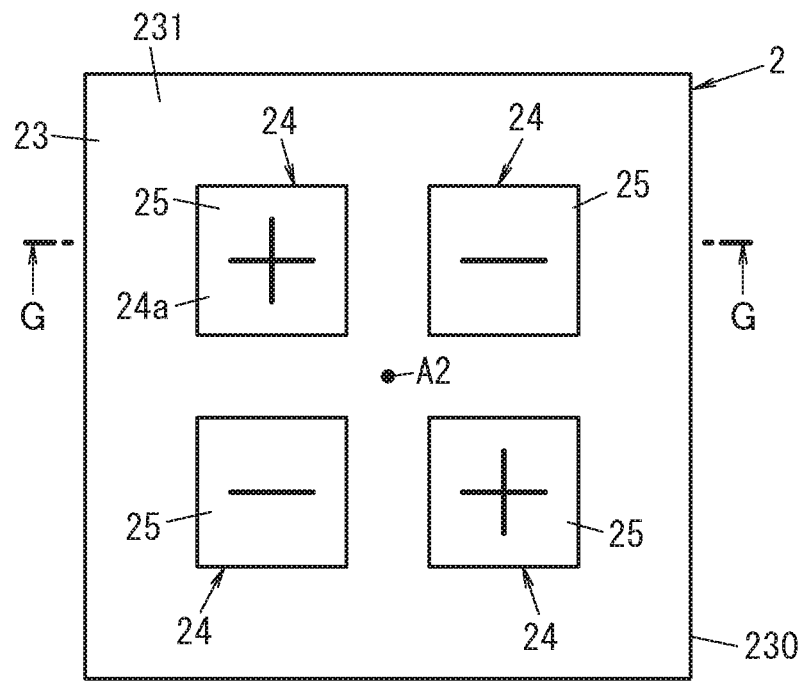
FIG. 6A is a plan view of an infrared sensing element in the infrared sensing device.
Figure 6B:
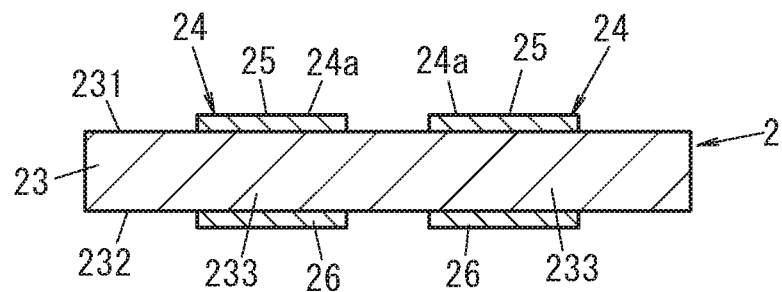
FIG. 6B is a cross-sectional view of the infrared sensing element in the infrared sensing device as taken along the plane G-G shown in FIG. 6A.
Figure 7:
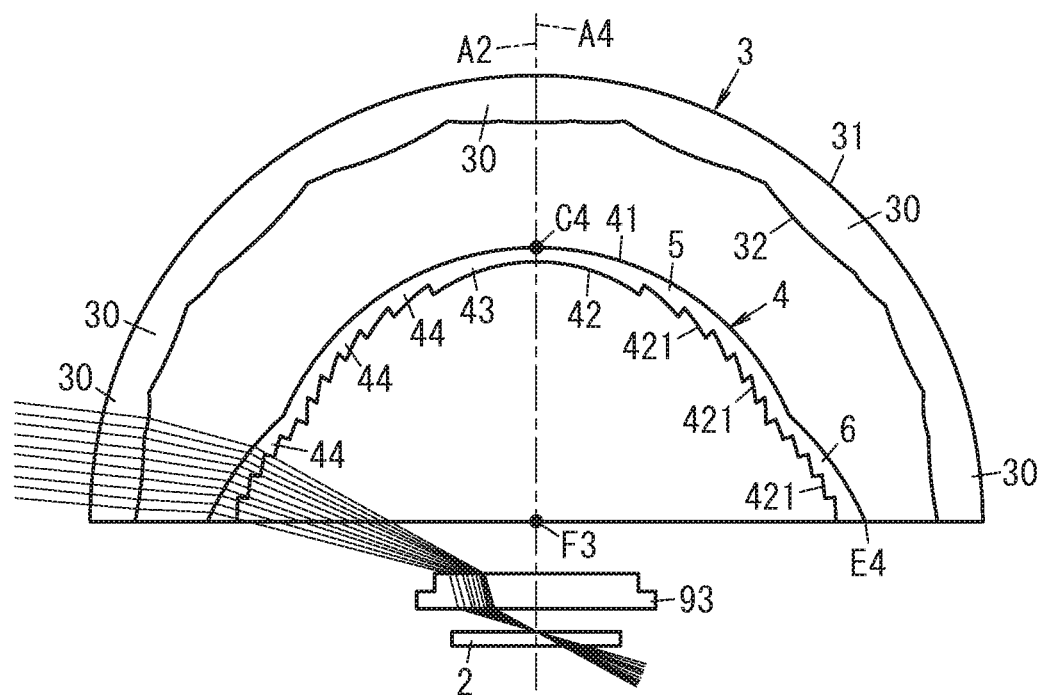
FIG. 7 illustrates a path along which an externally incoming infrared ray travels through the infrared sensing device.

As shown in FIGS. 1-7, the infrared sensing device 1 includes an infrared sensing element 2, a lens array 3, and a meniscus lens 4. The lens array 3 includes a plurality of (e.g., 53) lenses 30. An optical system including the lens array 3 and the meniscus lens 4 focuses an incoming infrared ray onto the infrared sensing element 2. In FIG. 7, the results of simulation representing the traveling path of an infrared ray are indicated by fine lines.

Figure 8:
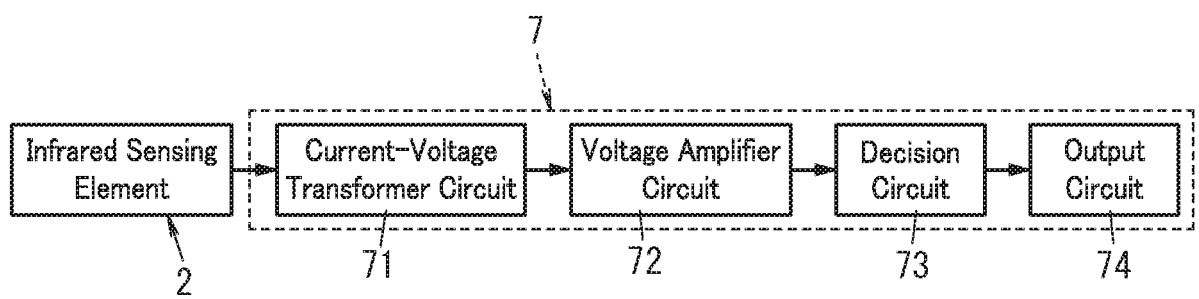
FIG. 8 is a circuit block diagram of the infrared sensing device.

In addition, the infrared sensing device 1 further includes a signal processing unit 7 (see FIG. 8). The signal processing unit 7 is configured to output a human body detection signal to an external device (external circuit) in accordance with an output signal of the infrared sensing element 2. The "human body detection signal" may be, for example, a pulse signal that goes high only for a certain period of time.

Figure 1:
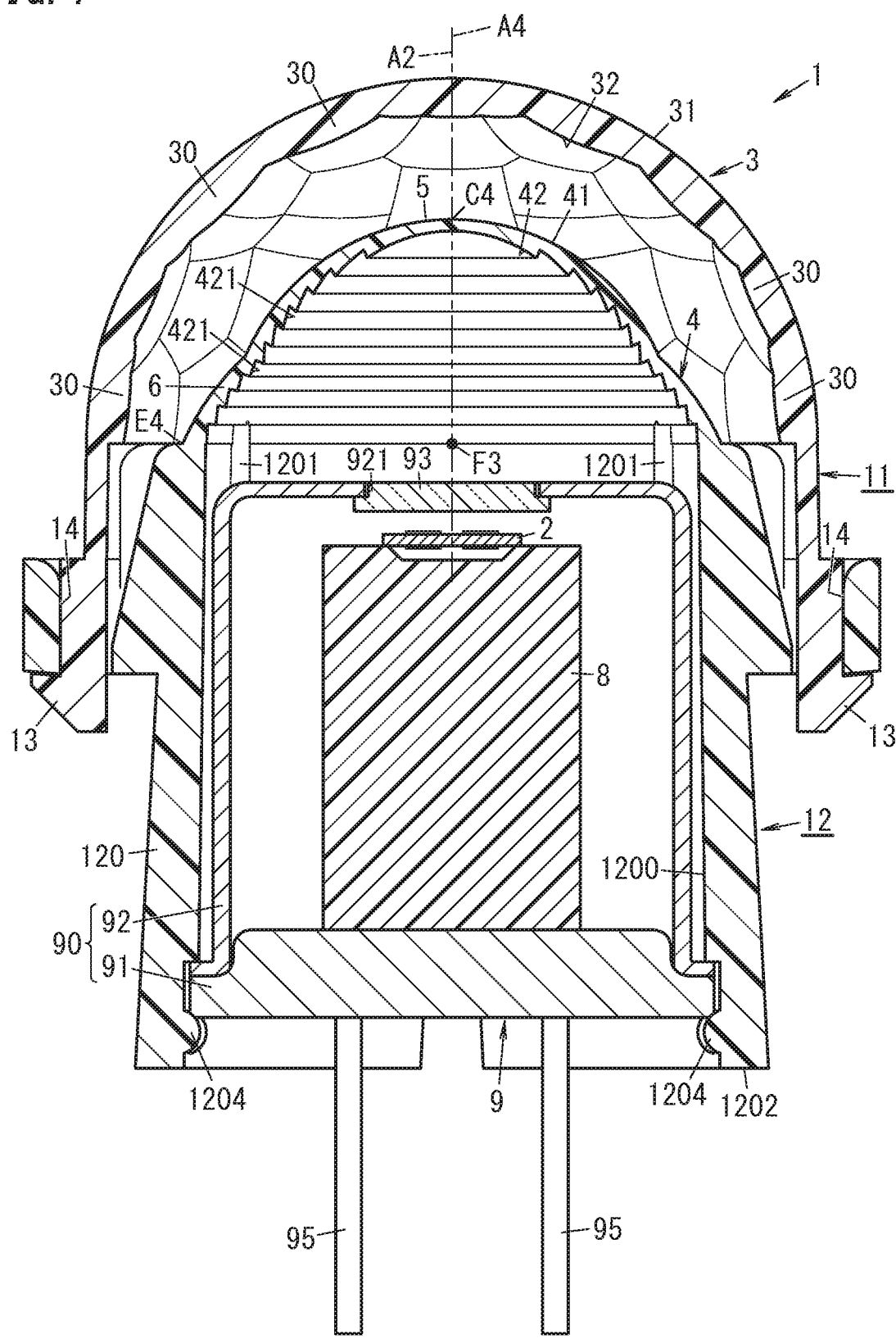
FIG. 1 is a longitudinal sectional view of an infrared sensing device according to a first embodiment of the present invention.

As shown in FIG. 1, the infrared sensing device 1 further includes a mounting board 8. On the mounting board 8, the infrared sensing element 2 and the signal processing unit 7 are assembled. The mounting board 8 may be a molded board, for example. The infrared sensing device 1 further includes a package 9 that houses the infrared sensing element 2 therein. The package 9 includes a window member 93 that transmits an infrared ray. The package 9 also houses the signal processing unit 7 and the mounting board 8.

Also, the infrared sensing device 1 includes a first member 11 including the lens array 3 and a second member 12 including the meniscus lens 4. The first member 11 and the second member 12 are integrated together.

(2) Respective Constituent Elements of Infrared Sensing Device

Next, the respective constituent elements of the infrared sensing device 1 will be described with reference to the accompanying drawings.

(2.1) Infrared Sensing Element

The infrared sensing element 2 is implemented as a pyroelectric element. More specifically, the infrared sensing element 2 may be implemented as, for example, a quad-type pyroelectric element in which four sensing units 24 are arranged on a single pyroelectric substrate 23 as shown in FIGS. 6A and 6B.

In this infrared sensing element 2, the four sensing units 24 are arranged to form a 2×2 matrix (array) on the single pyroelectric substrate 23.

The pyroelectric substrate 23 has a square planar shape. The pyroelectric substrate 23 is a substrate with pyroelectric properties. The pyroelectric substrate 23 may be configured as, for example, a single-crystal $LiTaO_3$ substrate.

Each of the plurality of sensing units 24 has a square planar shape. The infrared sensing element 2 is arranged such that in a central region of the pyroelectric substrate 23, a virtual square is defined inside the outer peripheral edges 230 of the pyroelectric substrate 23 and respective centers of the sensing units 24 are located at the four corners of the virtual square.

Each of the plurality of sensing units 24 has a square planar shape. Each of the plurality of sensing units 24 is implemented as a capacitor including a surface electrode 25 formed on a surface 231 of the pyroelectric substrate 23, a back surface electrode 26 formed on a back surface 232 of the pyroelectric substrate 23, and a portion 233, sandwiched between the surface electrode 25 and the back surface electrode 26, of the pyroelectric substrate 23. The surface electrode 25 is formed out of a conductive film that absorbs an infrared ray (such as an NiCr film). In FIG. 6A, in each of the plurality of sensing units 24, the polarity of the surface electrode 25 facing the lens array 3 is indicated by either the positive sign "+" or the negative sign "−." A photosensitive plane 24a of each of the plurality of sensing units 24 is the surface of the surface electrode 25. The surface of the surface electrode 25 is a principal surface, opposite from the surface in contact with the pyroelectric substrate 23, of the surface electrode 25.

As described above, the infrared sensing element 2 is a quad-type pyroelectric element including, as the plurality of sensing units 24, four sensing units 24 that are arranged to form a 2×2 matrix. In this embodiment, in the infrared sensing element 2, two sensing units 24 arranged along each of the two diagonal lines are connected together in parallel, each pair of sensing units 24 arranged in a row direction (i.e., the rightward/leftward direction in FIG. 6A) are connected together in anti-parallel, and each pair of sensing units 24 arranged in a column direction (i.e., the upward/downward direction in FIG. 6A) are also connected together in anti-parallel. Thus, in this infrared sensing element 2, the respective surface electrodes 25 of the two sensing units 24 arranged along each of the two diagonal lines have the same polarity. In addition, in this infrared sensing element 2, the respective surface electrodes 25 of each pair of sensing units 24 arranged in the row direction have opposite polarities. In addition, in this infrared sensing element 2, the respective surface electrodes 25 of each pair of sensing units 24 arranged in the column direction have opposite polarities.

The optical axis A2 of the infrared sensing element 2 is a normal to the center of a square including the respective photosensitive planes 24a of the plurality of sensing units 24.

(2.2) Package

As shown in FIGS. 1-4, the package 9 includes a package body 90 and a window member 93. The package 9 is a so-called "can package" and includes a plurality of (e.g., three) lead terminals 95. The package body 90 houses the infrared sensing element 2 and holds the window member 93. The package body 90 includes a pedestal 91 and a cap 92.

The pedestal 91 has electrical conductivity. In this embodiment, the pedestal 91 is made of a metallic material. The pedestal 91 has a disk shape and supports the mounting board 8 on one side thereof in the thickness direction.

The cap 92 also has electrical conductivity. In this embodiment, the cap 92 is also made of a metallic material. The cap 92 has the shape of a bottomed cylinder and is secured to the pedestal 91 so as to house the mounting board 8, the signal processing unit 7, and the infrared sensing element 2.

The window member 93 is a member that transmits an infrared ray. The window member 93 has electrical conductivity. In this embodiment, the window member 93 may include a silicon substrate, for example. The window member 93 may include not only the silicon substrate but also an infrared optical filter stacked on the silicon substrate. The infrared optical filter is an optical multilayer film that transmits an infrared ray falling within a wavelength range to be detected by the infrared sensing device 1.

The window member 93 is arranged to close a window port 921 provided through an anterior wall of the cap 92. The window member 93 is bonded to the cap 92 with an electrically conductive material and is electrically connected to the cap 92. The window member 93 is arranged in front of the photosensitive plane of the infrared sensing element 2. The photosensitive plane of the infrared sensing element 2 includes respective photosensitive planes 24a of the plurality of sensing units 24. In this infrared sensing device 1, the infrared sensing element 2 is arranged such that its optical axis A2 passes through the center of the window member 93. Thus, the window member 93 intersects (e.g., at right angles in this embodiment) with the optical axis A2 of the infrared sensing element 2. When viewed along the optical axis A2 of the infrared sensing element 2, the window member 93 is larger than the infrared sensing element 2.

Figure 2:
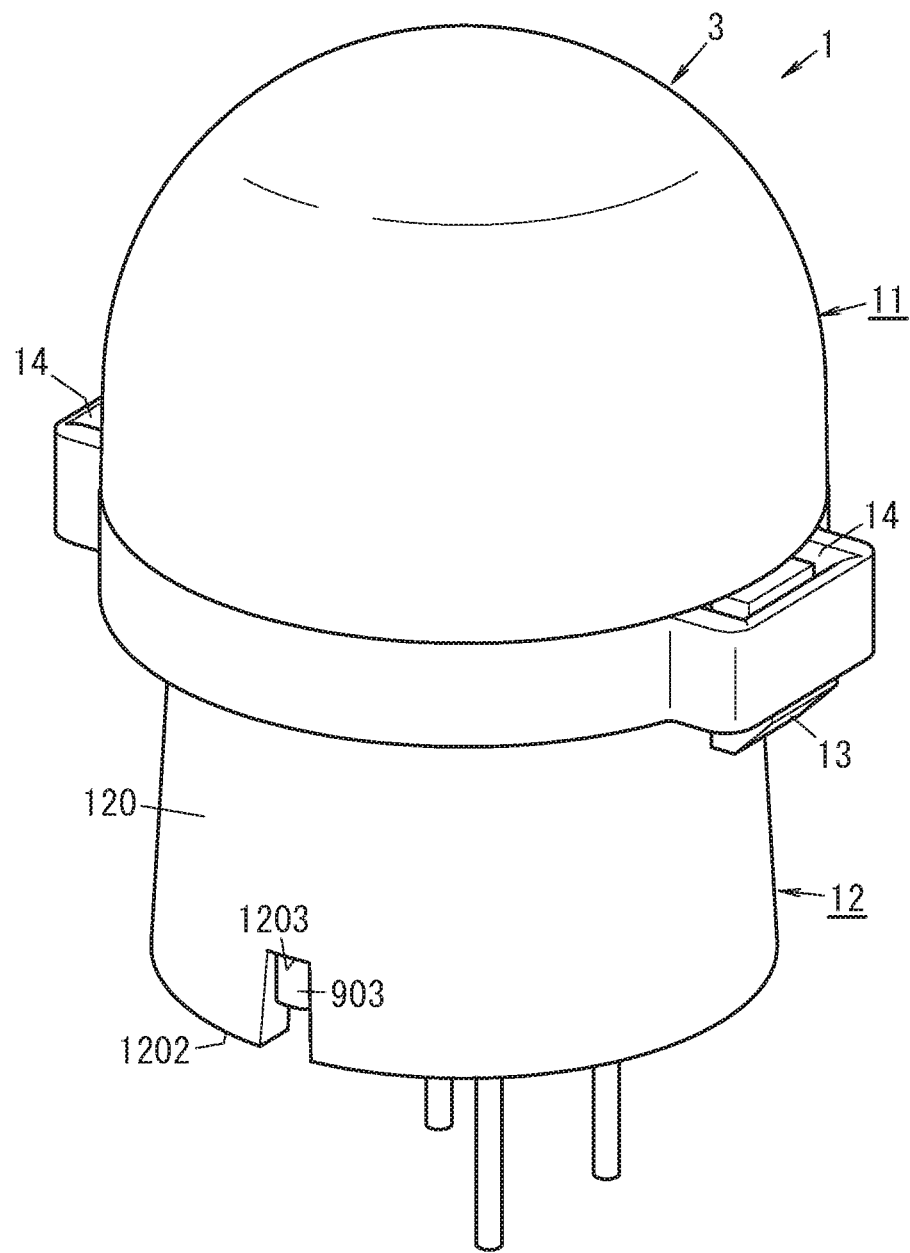
FIG. 2 is a perspective view of the infrared sensing device.
Figure 3:
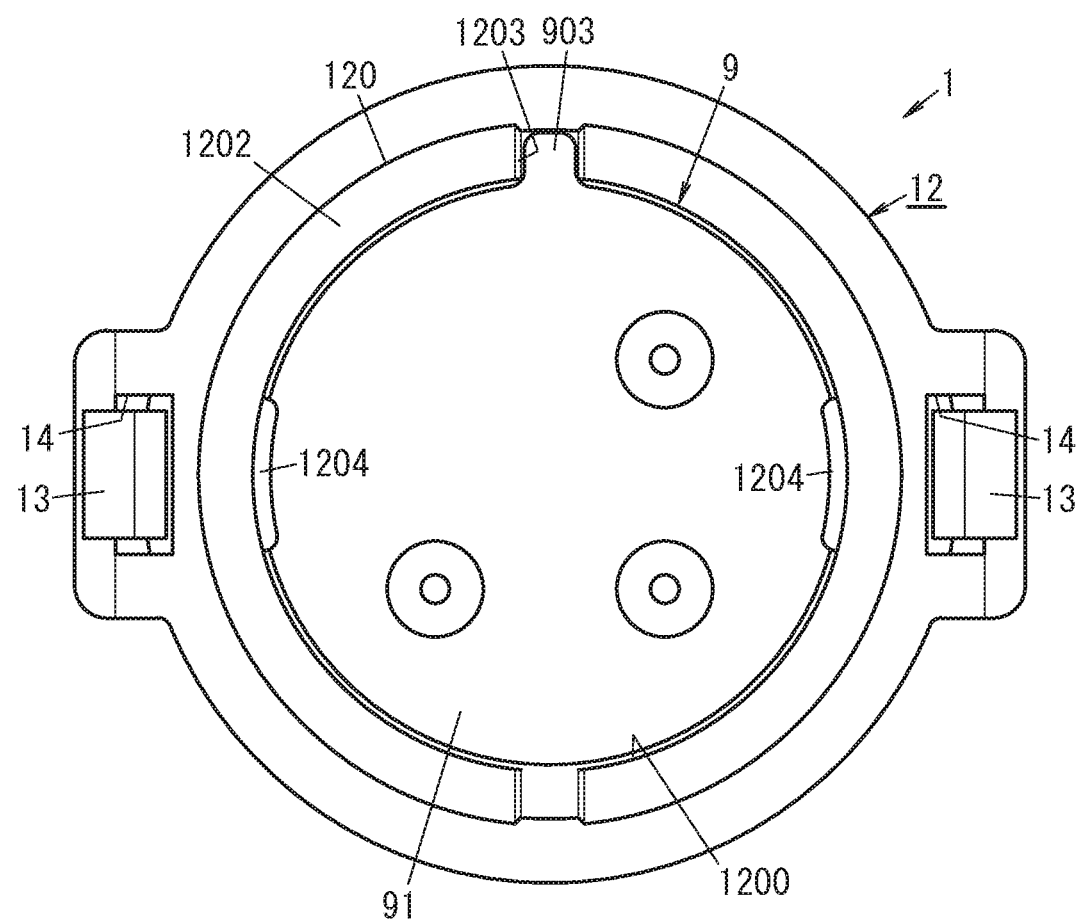
FIG. 3 is a bottom view of the infrared sensing device.
Figure 4:
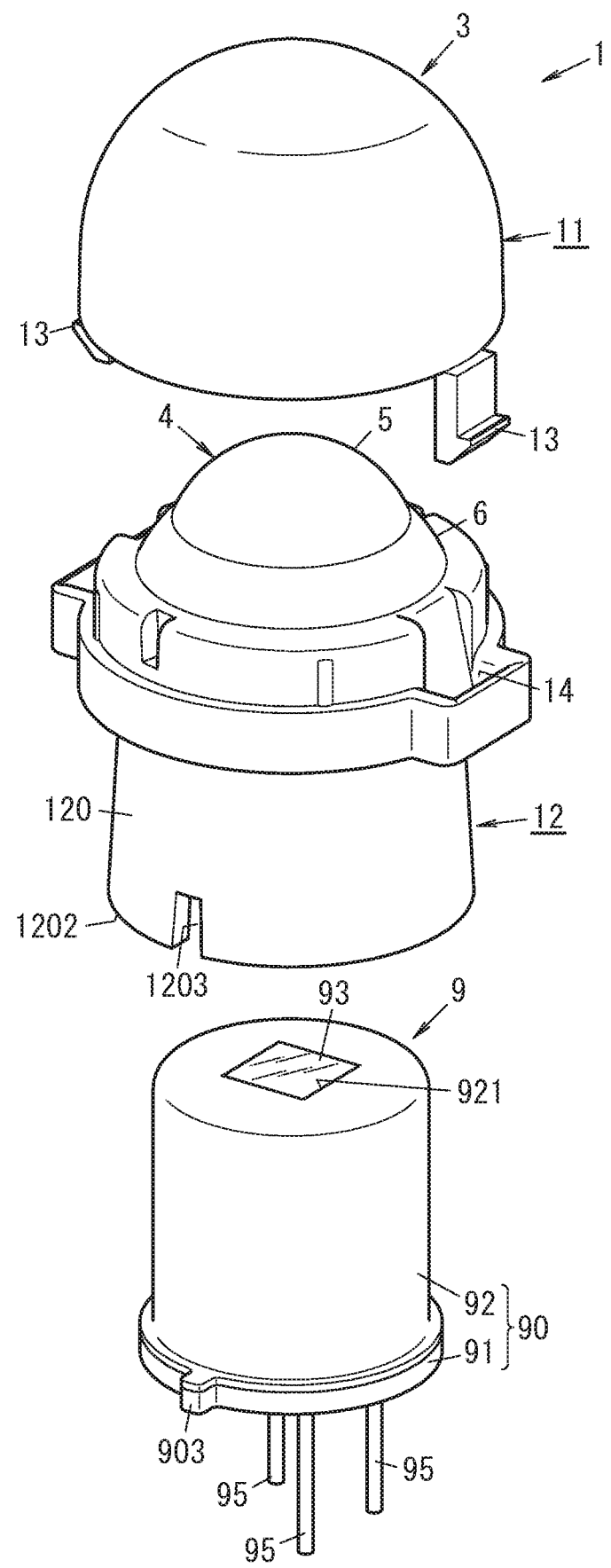
FIG. 4 is an exploded perspective view of the infrared sensing device.

The package 9 further includes a projection 903 (see FIGS. 2-4). The projection 903 protrudes in a direction intersecting with the optical axis A2 of the infrared sensing element 2 from one end, opposite from the window member 93, of the package body 90.

Three lead terminals 95 are held by the pedestal 91. Each of the three lead terminals 95 has a pin shape. Each of the three lead terminals 95 runs through the pedestal 91 along the thickness thereof. The three lead terminals 95 are used as a power feeding lead terminal, a signal outputting lead terminal, and a grounding lead terminal, respectively.

(2.3) Signal Processing Unit

The signal processing unit 7 (see FIG. 8) may be implemented as, for example, a single-chip integrated circuit (IC) element.

As shown in FIG. 8, the signal processing unit 7 may include a current-voltage transformer circuit 71, a voltage amplifier circuit 72, a decision circuit 73, and an output circuit 74, for example.

The current-voltage transformer circuit 71 is a circuit that transforms a current signal, which is an output signal of the infrared sensing element 2, into a voltage signal and outputs the voltage signal. The current-voltage transformer circuit 71 may be implemented as a combination of an operational amplifier and a capacitor, for example.

The voltage amplifier circuit 72 is a circuit that amplifies a component, falling within a predetermined frequency range (e.g., from 0.1 Hz to 10 Hz), of the voltage signal supplied from the current-voltage transformer circuit 71 and outputs the voltage signal thus amplified. The voltage amplifier circuit 72 may perform the function of a bandpass filter. As used herein, the function of a bandpass filter is the function of passing only the component falling within the predetermined wavelength range of the voltage signal supplied from the current-voltage transformer circuit 71 while filtering out unnecessary frequency components thereof as noise.

The decision circuit 73 is a circuit that compares the voltage signal supplied from the voltage amplifier circuit 72 with a preset threshold value to determine whether or not the voltage signal has exceeded the threshold value. The decision circuit 73 may be implemented as, for example, a comparator. More specifically, the decision circuit 73 may be implemented as a window comparator configured such that its output signal goes low (comes to have L-level) when the level of the voltage signal exceeds (i.e., becomes greater than) a first threshold value or exceeds (i.e., becomes less than) a second threshold value smaller than the first threshold value and goes high (comes to have H-level) when the voltage signal exceeds neither the first threshold value nor the second threshold value.

The output circuit 74 is a circuit that outputs a human body detection signal as an output signal when the decision circuit 73 determines that the voltage signal should have exceeded the threshold value. The output circuit may be implemented as a combination of a field-effect transistor and two resistors, for example. The field-effect transistor may be a p-channel enhancement MOSFET, for example.

(2.4) Lens Array

The lens array 3 is implemented as an array of multiple (e.g., 53) lenses 30.

A first surface 31, on which an externally incoming infrared ray is incident, of the lens array 3 is made up of a group of surfaces of incidence of those multiple lenses 30. A second surface 32, through which the infrared ray goes out, of the lens array 3 is made up of a group of surfaces of emergence of those multiple lenses 30.

The lens array 3 is arranged in front of the infrared sensing element 2. As used herein, when some member is arranged "in front of the infrared sensing element 2," it means that the member is arranged to face the photosensitive plane of the infrared sensing element 2 in a direction aligned with the optical axis A2 of the infrared sensing element 2. The lens array 3 is arranged to intersect with the optical axis A2 of the infrared sensing element 2. The lens array 3 has a focal point F3 on the same side as the infrared sensing element 2.

Each of the multiple lenses 30 is a condenser lens for focusing the infrared ray onto the infrared sensing element 2 and may be configured as a convex lens. In this embodiment, the convex lenses forming the multiple lenses 30 are aspherical lenses. However, this is only an example of the present invention and should not be construed as limiting. Alternatively, those convex lenses may also be spherical lenses, for example.

The lens array 3 is designed such that the respective focuses of the multiple lenses 30 on the same side as the infrared sensing element 2 are formed at the same point. Therefore, the focus F3 of the lens array 3 agrees with the focuses of the multiple lenses 30 on the same side as the infrared sensing element 2. The infrared ray to be controlled by each of the multiple lenses 30 may be an infrared ray falling within a wavelength range of 5 µm to 25 µm, for example.

Examples of materials for the lens array 3 include polyethylene. More specifically, a material for the lens array 3 may be polyethylene to which either a white pigment or a black pigment is added. As the white pigment, an inorganic pigment such as titanium dioxide is suitably adopted. As the black pigment, fine particles of carbon black, for example, are suitably adopted. The lens array 3 may be formed by molding, for example. Examples of the molding include injection molding and compression molding.

(2.5) Meniscus Lens

The meniscus lens 4 has a dome shape and is arranged between the lens array 3 and the infrared sensing element 2. The meniscus lens 4 has a first surface 41 facing the lens array 3 and a second surface 42 facing the infrared sensing element 2. The meniscus lens 4 has a central portion 5 and a peripheral portion 6. The central portion 5 includes a top point C4 that is an intersection between the optical axis A4 of the meniscus lens 4 and the first surface 41. The peripheral portion 6 includes an end E4 of the first surface 41 of the meniscus lens 4.

The meniscus lens 4 is an aplanatic meniscus lens. The aplanatic meniscus lens is a type of meniscus lens. As used herein, the "aplanatic meniscus lens" refers to a meniscus lens with a pair of aplanatic points as a pair of conjugate points. Also, the "aplanatic points" refer to a pair of conjugate points when an object point on the optical axis forms an image theoretically free from aberrations in a rotationally symmetric optical imaging system.

With this regard, before the meniscus lens 4 of the infrared sensing device 1 according to the first embodiment is described in detail, the principle of the meniscus lens will be described with reference to FIGS. 11A-11E. In FIGS. 11A-11E, the results of simulation representing the traveling path of the infrared ray are indicated by fine lines.

Figure 11A:
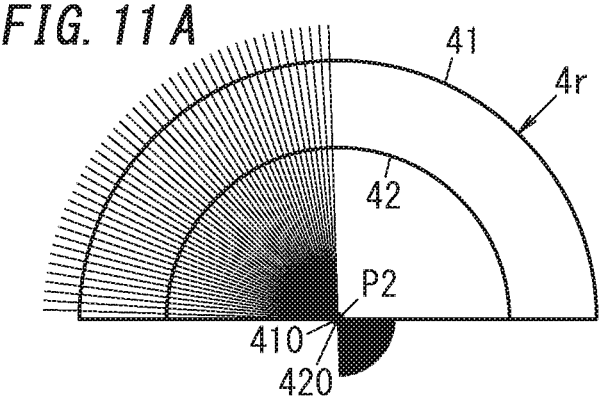
FIG. 11A illustrates where a focal point of a meniscus lens is formed according to Principle #1.

In a meniscus lens 4r according to a first example shown in FIG. 11A, each of the first surface 41 and the second surface 42 is configured as a part of a spherical surface. In the meniscus lens 4r according to the first example, the center of a spherical surface corresponding to the first surface 41 (i.e., the aplanatic point 410) agrees with the center of a spherical surface corresponding to the second surface 42 (i.e., the aplanatic point 420). In the meniscus lens 4r according to the first example, an infrared ray incident perpendicularly to the first surface 41 is focused at a focusing position P2 without being refracted by the first surface 41 or the second surface 42. The focusing position P2 is located at the same position as the aplanatic point 410 and the aplanatic point 420.

Figure 11B:
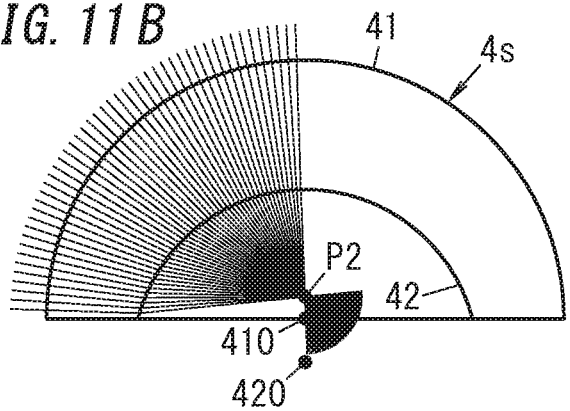
FIG. 11B illustrates where a focal point of a meniscus lens is formed according to Principle #2.

In a meniscus lens 4s according to a second example shown in FIG. 11B, each of the first surface 41 and the second surface 42 is configured as a part of a spherical surface. In the meniscus lens 4s according to the second example, the center of a spherical surface corresponding to the first surface 41 (i.e., the aplanatic point 410) disagrees with the center of a spherical surface corresponding to the second surface 42 (i.e., the aplanatic point 420). In a direction aligned with the optical axis of the meniscus lens 4s (i.e., the upward/downward direction in FIG. 11B), the aplanatic point 420 is more distant from the second surface 42 than the aplanatic point 410 is. In the meniscus lens 4s according to the second example, an infrared ray incident perpendicularly to the first surface 41 is not refracted by the first surface 41 but is refracted by the second surface 42 to be focused at a focusing position P2. The focusing position P2 is located at a position shifted from the aplanatic point 410 toward the second surface 42 in the direction aligned with the optical axis of the meniscus lens 4s.

Figure 11C:
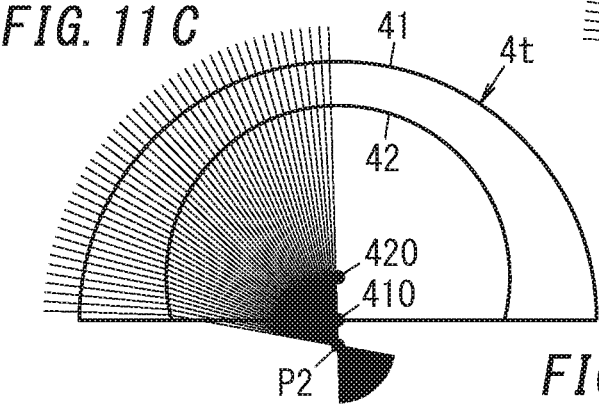
FIG. 11C illustrates where a focal point of a meniscus lens is formed according to Principle #3.

In a meniscus lens 4t according to a third example shown in FIG. 11C, each of the first surface 41 and the second surface 42 is configured as a part of a spherical surface. In the meniscus lens 4t according to the third example, the center of a spherical surface corresponding to the first surface 41 (i.e., the aplanatic point 410) disagrees with the center of a spherical surface corresponding to the second surface 42 (i.e., the aplanatic point 420). In a direction aligned with the optical axis of the meniscus lens 4t (i.e., the upward/downward direction in FIG. 11C), the aplanatic point 420 is located closer to the second surface 42 than the aplanatic point 410 is. In the meniscus lens 4t according to the third example, an infrared ray incident perpendicularly to the first surface 41 is not refracted by the first surface 41 but is refracted by the second surface 42 to be focused at a focusing position P2. The focusing position P2 is located at a position shifted from the aplanatic point 410 opposite from the second surface 42 in the direction aligned with the optical axis of the meniscus lens 4t.

Figure 11D:
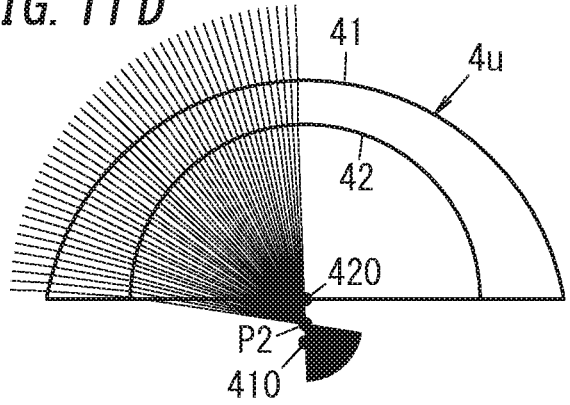
FIG. 11D illustrates where a focal point of a meniscus lens is formed according to Principle #4.

In a meniscus lens 4u according to a fourth example shown in FIG. 11D, each of the first surface 41 and the second surface 42 is configured as a part of a spherical surface. In the meniscus lens 4u according to the fourth example, the center of a spherical surface corresponding to the first surface 41 (i.e., the aplanatic point 410) disagrees with the center of a spherical surface corresponding to the second surface 42 (i.e., the aplanatic point 420). In a direction aligned with the optical axis of the meniscus lens 4u (i.e., the upward/downward direction in FIG. 11D), the aplanatic point 410 is located more distant from the second surface 42 than the aplanatic point 420 is. In the meniscus lens 4u according to the fourth example, an infrared ray incident perpendicularly to the first surface 41 is not refracted by the first surface 41 but is refracted by the second surface 42 to be focused at a focusing position P2. The focusing position P2 is located at a position shifted from the aplanatic point 420 opposite from the second surface 42 in the direction aligned with the optical axis of the meniscus lens 4u.

Figure 11E:
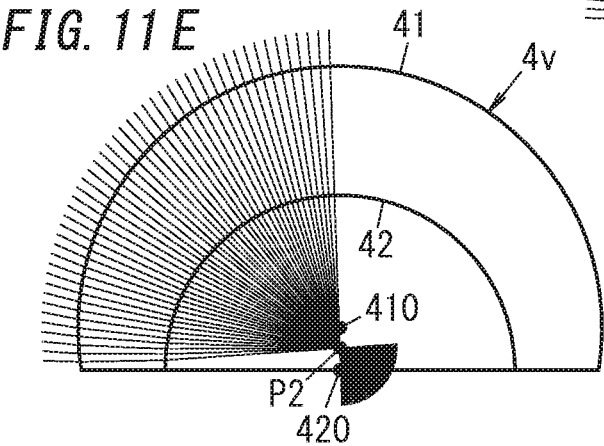
FIG. 11E illustrates where a focal point of a meniscus lens is formed according to Principle #5.

In a meniscus lens 4v according to a fifth example shown in FIG. 11E, each of the first surface 41 and the second surface 42 is configured as a part of a spherical surface. In the meniscus lens 4v according to the fifth example, the center of a spherical surface corresponding to the first surface 41 (i.e., the aplanatic point 410) disagrees with the center of a spherical surface corresponding to the second surface 42 (i.e., the aplanatic point 420). In a direction aligned with the optical axis of the meniscus lens 4v (i.e., the upward/downward direction in FIG. 11E), the aplanatic point 410 is located closer to the second surface 42 than the aplanatic point 420 is. In the meniscus lens 4v according to the fifth example, an infrared ray incident perpendicularly to the first surface 41 is not refracted by the first surface 41 but is refracted by the second surface 42 to be focused at a focusing position P2. The focusing position P2 is located at a position shifted from the aplanatic point 410 opposite from the second surface 42 in the direction aligned with the optical axis of the meniscus lens 4v and located at a midpoint between the aplanatic point 410 and the aplanatic point 420.

As can be seen from the first through fifth examples, to broaden the sensing area of the infrared sensing device 1 including the infrared sensing element 2 arranged opposite from the lens array 3 with respect to the meniscus lens 4 (i.e., on the lower side in FIG. 1) as shown in FIG. 1, the center of the first surface 41 (i.e., the aplanatic point 410) needs to be located under the center of the second surface 42 (i.e., the aplanatic point 420) as in the third and fourth examples.

Figure 12A:
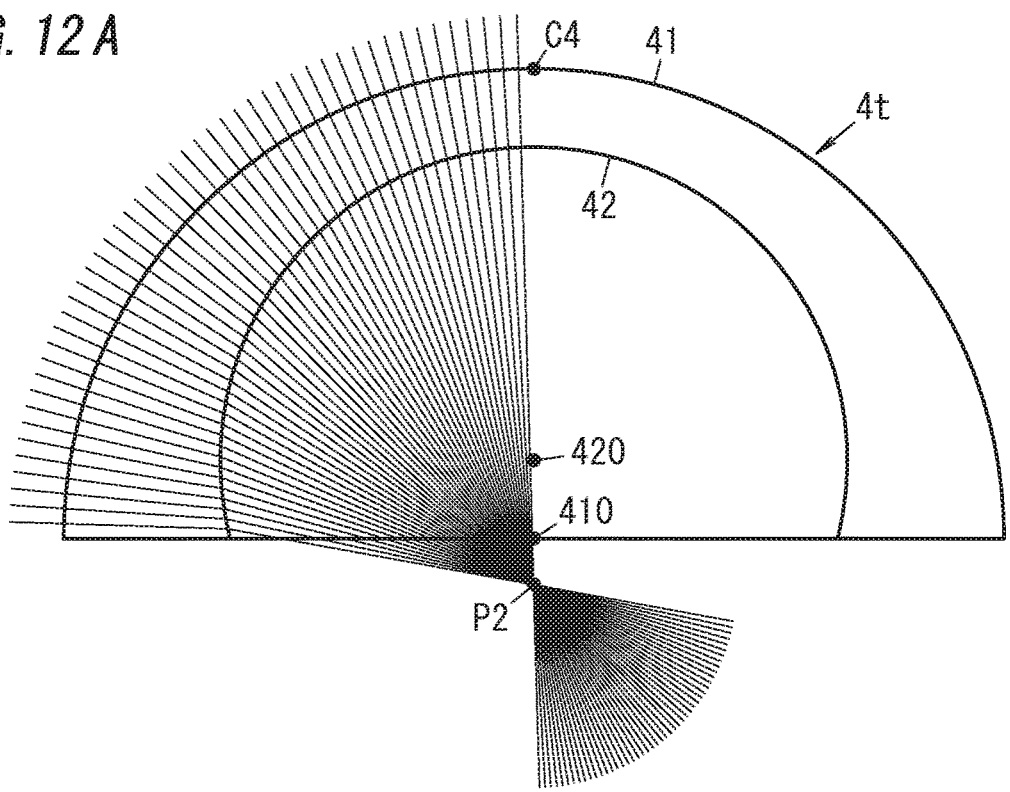
FIG. 12A illustrates where a focal point of a meniscus lens is formed according to the Principle #3.
Figure 12B:
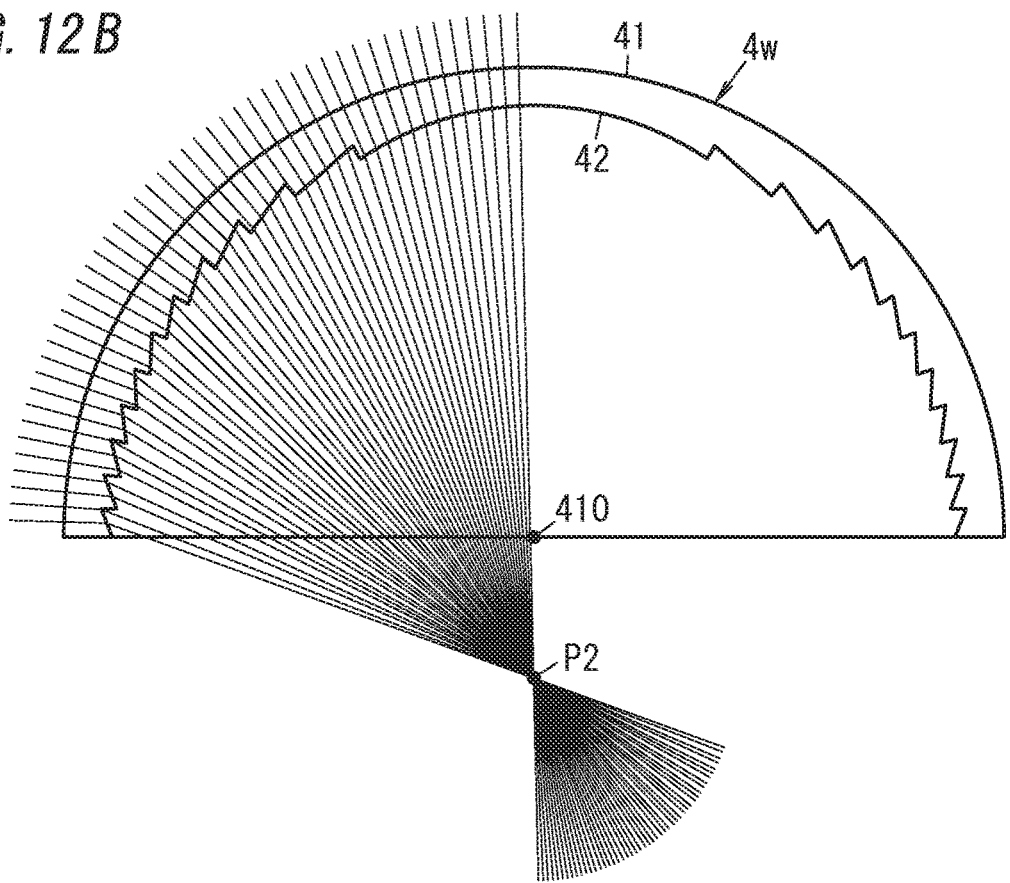
FIG. 12B illustrates where the focal point of the meniscus lens shown in FIG. 12A is formed when the meniscus lens is configured as a Fresnel lens.

In the meniscus lens 4t according to the third example (see FIGS. 11C and 12A), however, the second surface 42 is larger than a hemispherical surface. Thus, when configured as a Fresnel lens, the meniscus lens 4t may have a reduced thickness but turns into a meniscus lens 4w with a shape as shown in FIG. 12B. Such a meniscus lens 4w could not be released from the mold when formed by injection molding. Note that in FIGS. 12A and 12B, the results of simulation representing the traveling path of the infrared ray are indicated by fine lines.

Figure 13:
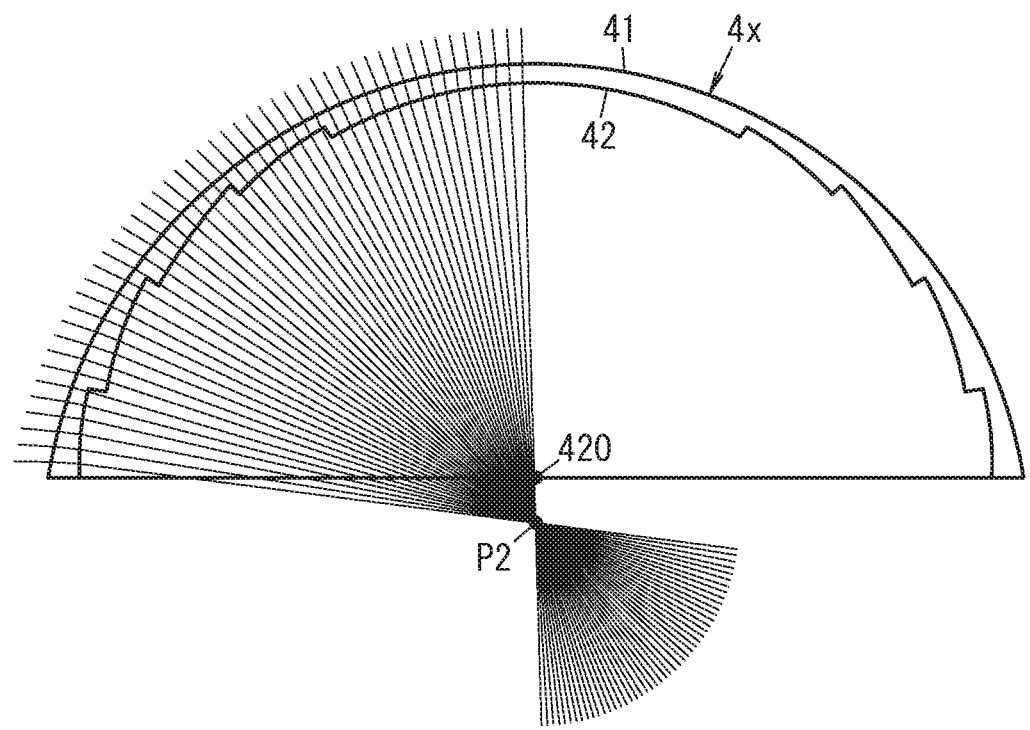
FIG. 13 illustrates where a focal point of a meniscus lens is formed according to the Principle #4 when the meniscus lens is configured as a Fresnel lens.

Meanwhile, when configured as a Fresnel lens, the meniscus lens 4u according to the fourth example (see FIG. 11D) turns into a meniscus lens 4x with a shape as shown in FIG. 13. Such a meniscus lens 4x could be released from the mold when formed by injection molding. However, the infrared ray incident on the meniscus lens 4x would be refracted by both the first surface 41 and the second surface 42 thereof, thus causing an aberration. Note that in FIG. 13, the results of simulation representing the traveling path of the infrared ray are indicated by fine lines.

Figure 10A:
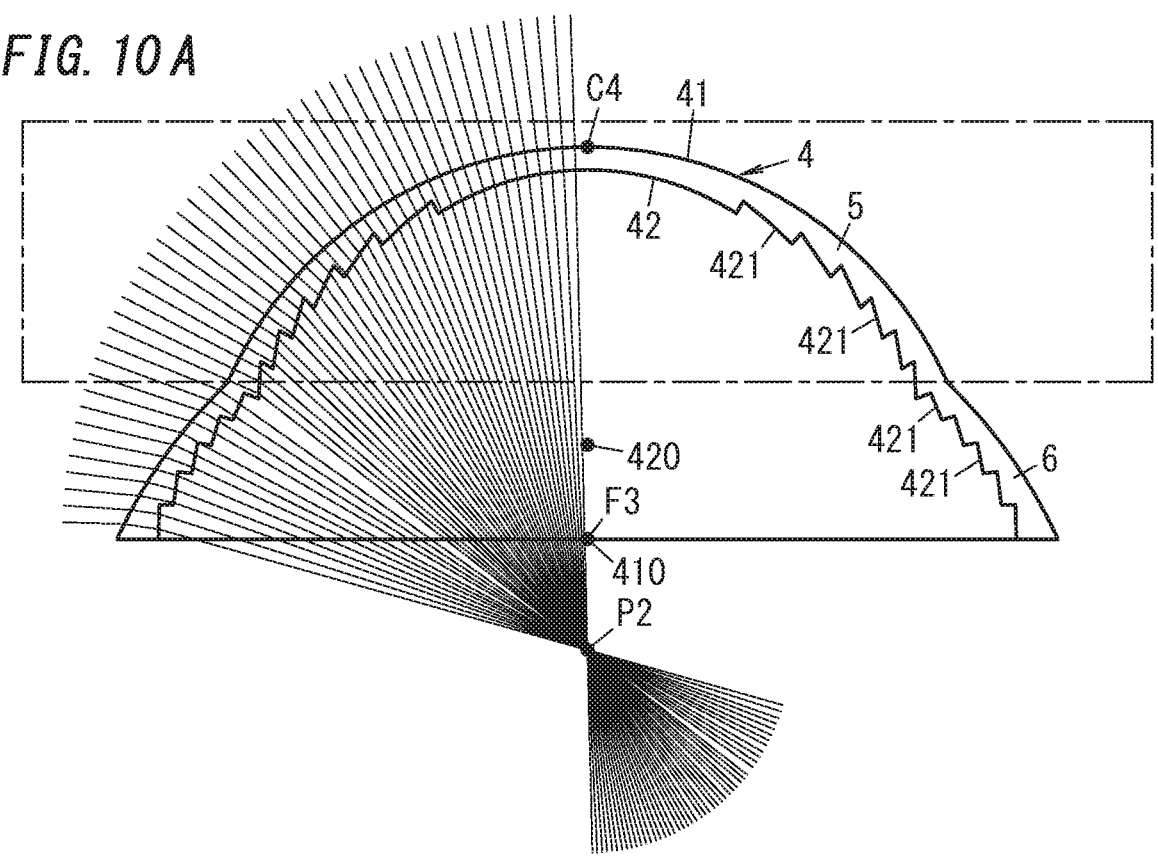
FIG. 10A illustrates a central portion of the meniscus lens in the infrared sensing device.
Figure 10B:
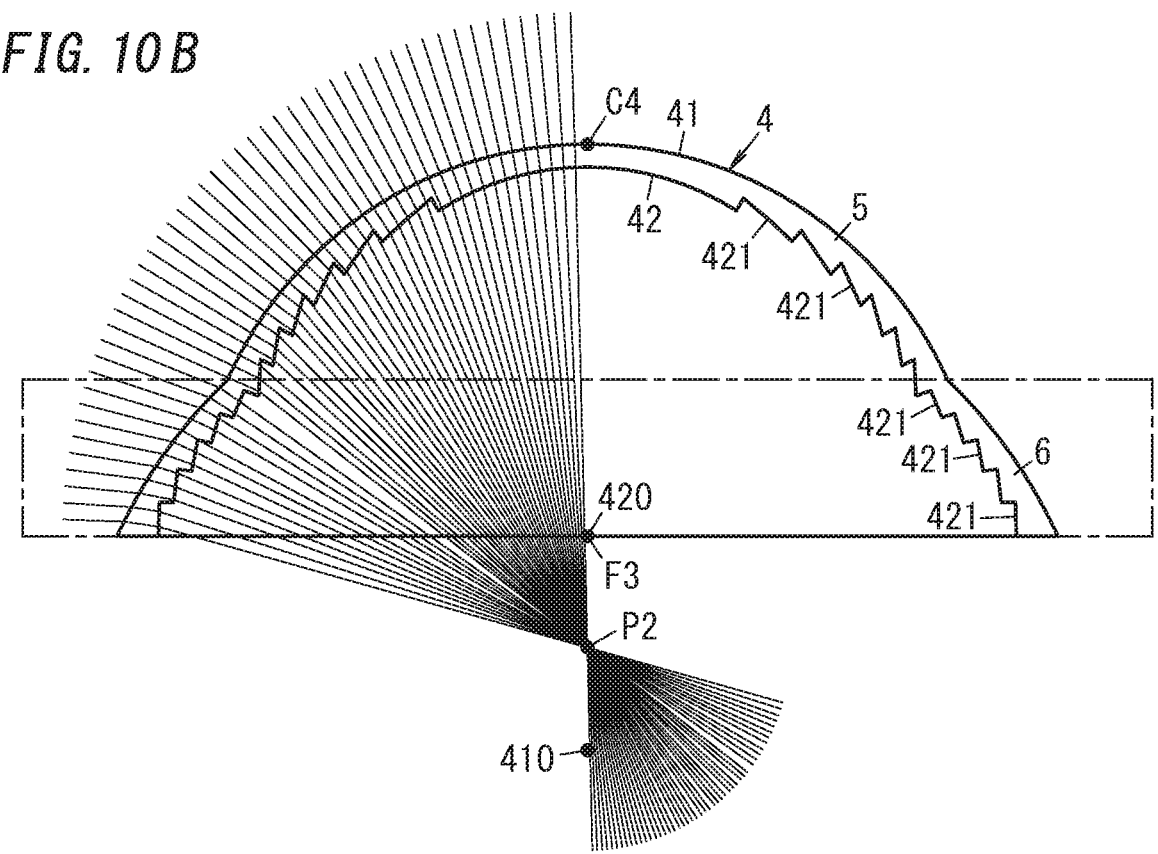
FIG. 10B illustrates a peripheral portion of the meniscus lens in the infrared sensing device.

In contrast, in the infrared sensing device 1 according to the first embodiment, with respect to the central portion 5 of the meniscus lens 4, the aplanatic point 410 of the first surface 41 is located at the focus F3 of the lens array 3 as shown in FIG. 10A. Meanwhile, with respect to the peripheral portion 6 of the meniscus lens 4, the aplanatic point 420 of the second surface 42 is located at the focus F3 of the lens array 3 as shown in FIG. 10B. The aplanatic point 410 of the first surface 41 and the aplanatic point 420 of the second surface 42 are located on the optical axis A4 of the meniscus lens 4 (see FIGS. 1 and 7). That is to say, the principle of the third example (Principle #3) is adopted for the central portion 5 of the meniscus lens 4 and the principle of the fourth example (Principle #4) is adopted for the peripheral portion 6 of the meniscus lens 4 Thus, the infrared sensing device 1 according to the first embodiment has such a shape as to allow the meniscus lens 4 to be released from the mold when formed by injection molding and yet is able to reduce aberrations. Note that in FIGS. 10A and 10B, the results of simulation representing the traveling path of the infrared ray are indicated by fine lines.

Examples of materials for the meniscus lens 4 include polyethylene. More specifically, a material for the meniscus lens 4 may be polyethylene to which either a white pigment or a black pigment is added. As the white pigment, an inorganic pigment such as titanium dioxide is suitably adopted. As the black pigment, fine particles of carbon black, for example, are suitably adopted. The meniscus lens 4 may be formed by molding, for example. Examples of the molding include injection molding and compression molding.

The infrared ray to be controlled by the meniscus lens 4 may be an infrared ray falling within a wavelength range of 5 μm to 25 μm, for example. The greater the thickness of the meniscus lens 4 is, the lower the transmittance of the infrared ray to be controlled is. As the thickness of the meniscus lens 4 increases by 0.1 mm, the transmittance of a perpendicularly incident infrared ray to be controlled decreases by approximately 10%. As used herein, if an infrared ray is incident perpendicularly, then it means that the infrared ray is incident on an arbitrary point on the first surface 41 of the meniscus lens 4 along a normal to the arbitrary point.

Figure 5A:
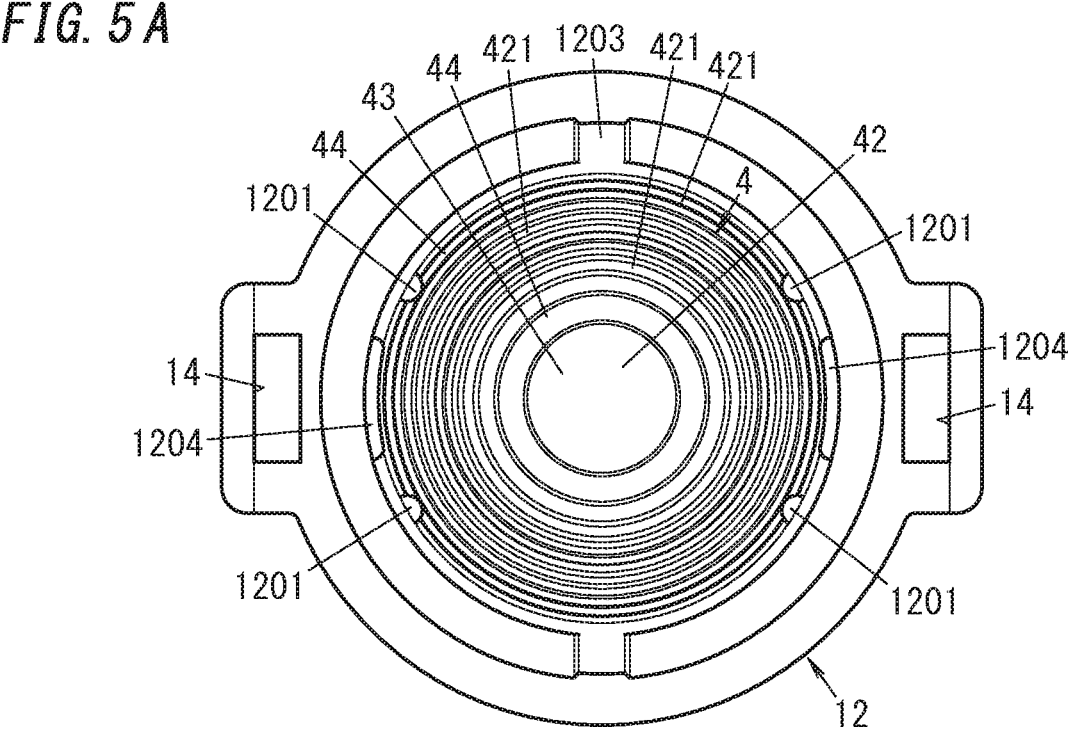
FIG. 5A is a bottom view of a second member including a meniscus lens for the infrared sensing device.

In the infrared sensing device 1 according to the first embodiment, the meniscus lens 4 is configured as a Fresnel lens. This allows the infrared sensing device 1 according to the first embodiment to reduce the thickness of the meniscus lens 4 and increase the sensitivity. Note that in the infrared sensing device 1 according to the first embodiment, the meniscus lens 4 includes a single center lens 43 and a plurality of (e.g., 11) concentric ring lenses 44 as shown in FIGS. 5A and 7.

(2.6) First Member and Second Member

In the infrared sensing device 1, the first member 11 including the lens array 3 and the second member 12 including the meniscus lens 4 are integrated together as described above (see FIG. 1). The first member 11 is a resin molded product including the lens array 3. The second member 12 is a resin molded product including the meniscus lens 4.

In the infrared sensing device 1, one member (e.g., the first member 11 in this embodiment) selected from the group consisting of the first member 11 and the second member 12 has a plurality of (e.g., two) hooks 13 and the other member (e.g., the second member 12 in this embodiment) has a plurality of (e.g., two) holes 14 corresponding one to one to the plurality of (e.g., two) hooks 13. In the infrared sensing device 1, each of the plurality of hooks 13 passes through a corresponding one of the holes 14 and is hooked on a region surrounding the corresponding hole 14 (e.g., a region surrounding the hole 14 of the second member 12), thus making the first member 11 and the second member 12 integrated together. That is to say, in this infrared sensing device 1, the first member 11 and the second member 12, which are two distinct members, are integrated together by being joined together.

Figure 5B:
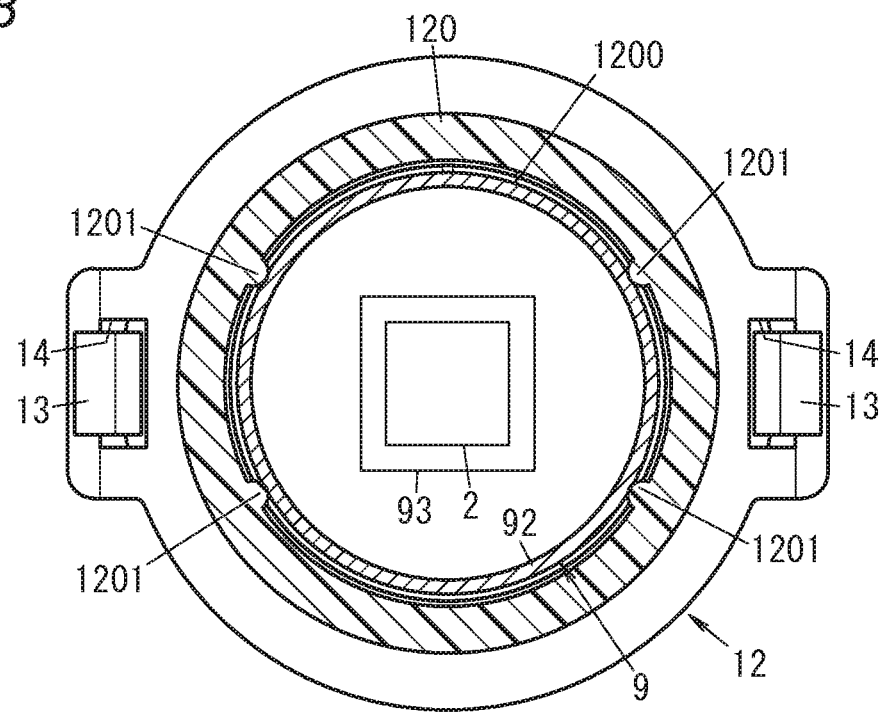
FIG. 5B is a cross-sectional view of the infrared sensing device.

The second member 12 includes a cylindrical portion 120 and a plurality of ribs 1201 (see FIGS. 5A and 5B). The cylindrical portion 120 surrounds the package 9. The plurality of ribs 1201 are spaced apart from each other along the circumference of the cylindrical portion 120 and protrude from the inner peripheral surface 1200 of the cylindrical portion 120. In the infrared sensing device 1, the plurality of ribs 1201 are in contact with a side surface of the package 9 (i.e., a side surface of the cap 92 of the package 9). The cylindrical portion 120 has the shape of a circular cylinder. In the second member 12, the cylindrical portion 120 is thicker than the meniscus lens 4. This allows the infrared sensing device 1 to reduce the chances of an externally incoming infrared ray being transmitted through the cylindrical portion 120 to be incident on the side surface of the package 9.

The second member 12 includes positioning protrusions 1204 (see FIGS. 3 and 5A). The positioning protrusions 1204 protrude from the inner peripheral surface 1200 of the cylindrical portion 120. The positioning protrusions 1204 abut on one side, opposite from the meniscus lens 4, of the package 9. More specifically, the positioning protrusions 1204 of the second member 12 abut on the back surface of the pedestal 91 of the package body 90. The second member 12 includes a plurality of (e.g., two) positioning protrusions 1204. The plurality of positioning protrusions 1204 are spaced apart from each other along the circumference of the cylindrical portion 120.

In addition, the cylindrical portion 120 of the second member 12 also has a groove 1203 (see FIGS. 2-4) in which the projection 903 is fitted on an end face 1202 opposite from the meniscus lens 4.

(2.7) Sensing Area of Infrared Sensing Device

Figure 9:
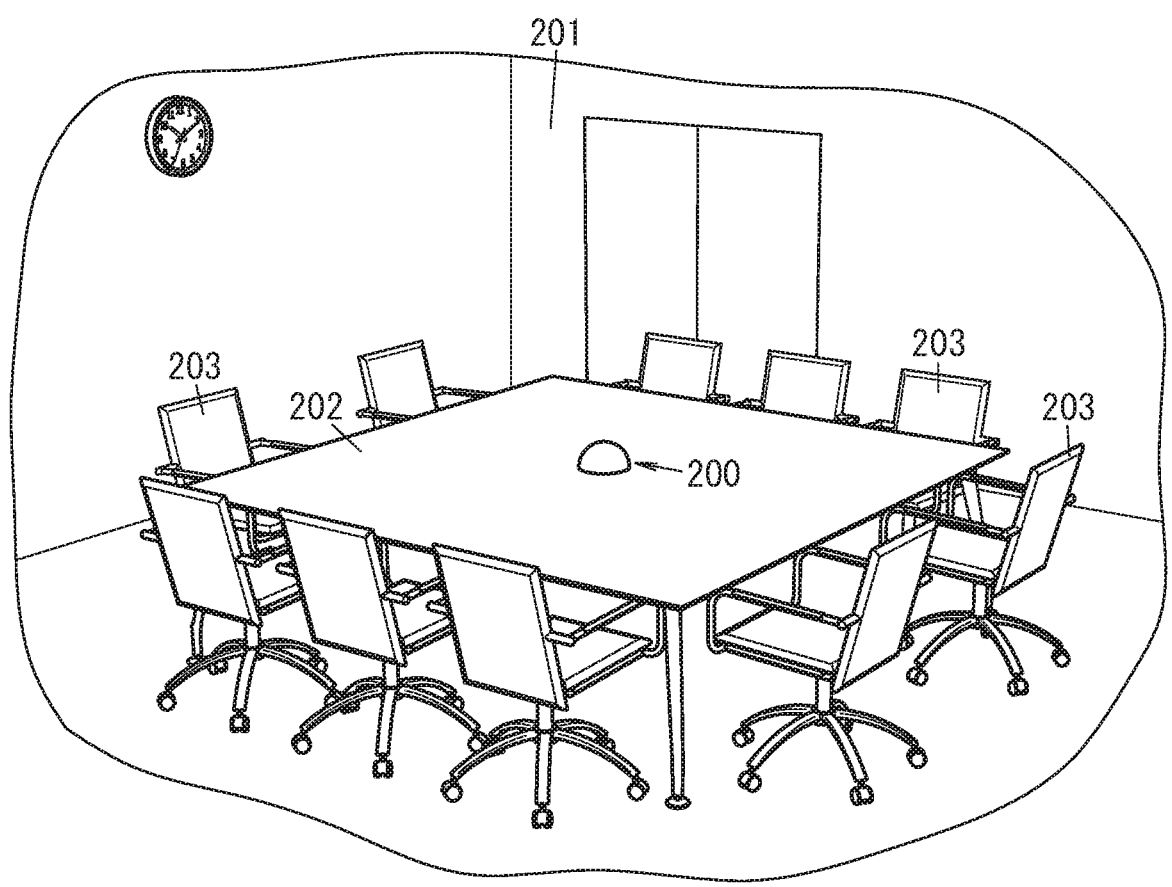
FIG. 9 is a perspective view illustrating an exemplary application of the infrared sensing device.

An infrared sensing device 1 according to the first embodiment may be used to sense any heat source within a given sensing area. The heat source may be a human, for example. The sensing area is actually invisible. In the infrared sensing device 1 according to the first embodiment, the sensing area has a hemispherical shape. The infrared sensing device 1 may be installed in a load control device 200 arranged on a table 202 of an assembly room 201 of an office, for example, as shown in FIG. 9. In that case, when used, the infrared sensing device 1 is arranged such that the photosensitive plane of the infrared sensing element 2 faces vertically upward. The load control device 200 is a device for controlling a load (such as a lighting load, an air conditioner, or an image capture device) the assembly room 201 based on the results of sensing obtained from persons seated on a plurality of chairs 203 in the assembly room 201, for example. In this example, the load control device 200 includes a control unit for controlling the load in accordance with a human body detection signal supplied from the infrared sensing device 1. The control unit may be implemented as, for example, a computer including a central processing unit (CPU) and a memory.

In the infrared sensing device 1, the sensing area is determined by a photodetector unit including the infrared sensing element 2, the lens array 3, and the meniscus lens 4. The photodetector unit further includes the window member 93. The sensing area sometimes depends on the size and shape of the window member 93 of the package 9 (see FIGS. 1 and 4) and the aperture shape of the window port 921 of the cap 92, for example.

(3) Advantages

An infrared sensing device 1 according to a first embodiment described above includes an infrared sensing element 2, a lens array 3, and a meniscus lens 4. The lens array 3 includes multiple lenses 30. The lens array 3 is arranged to intersect with an optical axis A2 of the infrared sensing element 2. The lens array 3 has a focus F3 on the same side as the infrared sensing element 2. The meniscus lens 4 has a dome shape and is arranged between the lens array 3 and the infrared sensing element 2. The meniscus lens 4 has a first surface 41 facing the lens array 3 and a second surface 42 facing the infrared sensing element 2. The meniscus lens 4 has a central portion 5 and a peripheral portion 6. The central portion 5 includes a top point C4 that is an intersection between the optical axis A4 of the meniscus lens 4 and the first surface 41. The peripheral portion 6 includes an end E4 of the first surface 41 of the meniscus lens 4. With respect to the central portion 5 of the meniscus lens 4, an aplanatic point 410 of the first surface 41 is located at a focus F3 of the lens array 3. With respect to the peripheral portion 6 of the meniscus lens 4, an aplanatic point 420 of the second surface 42 is located at the focus F3 of the lens array 3.

This allows the infrared sensing device 1 according to the first embodiment to curb a decline in sensitivity while broadening the sensing area (e.g., achieving a sensing angle of 150 degrees or more). In addition, in the infrared sensing device 1 according to the first embodiment, no optical member with a reflective piece is provided between the lens array 3 and the window member 93, thus making avoidable an unwanted situation where the incoming infrared ray is cut off by the reflective piece.

In addition, in the infrared sensing device 1 according to the first embodiment, the meniscus lens 4 is configured as a Fresnel lens having, on the second surface 42, a plurality of lens surfaces 421 (see FIGS. 1, 5, and 7) that are concentric around the optical axis A4 of the meniscus lens 4. The first surface 41 has a larger radius of curvature in the peripheral portion 6 than in the central portion 5. Each of the plurality of lens surfaces 421 is tilted such that as a distance from the top point C4 increases in a direction parallel to the optical axis A4 of the meniscus lens 4, a distance from the optical axis A4 to the lens surface 421 also increases accordingly. Alternatively, each of the plurality of lens surfaces 421 is parallel to the optical axis A4 of the meniscus lens 4.

This allows the infrared sensing device 1 according to the first embodiment to not only form the meniscus lens 4 by molding but also reduce aberrations.

Second Embodiment

Figure 14A:
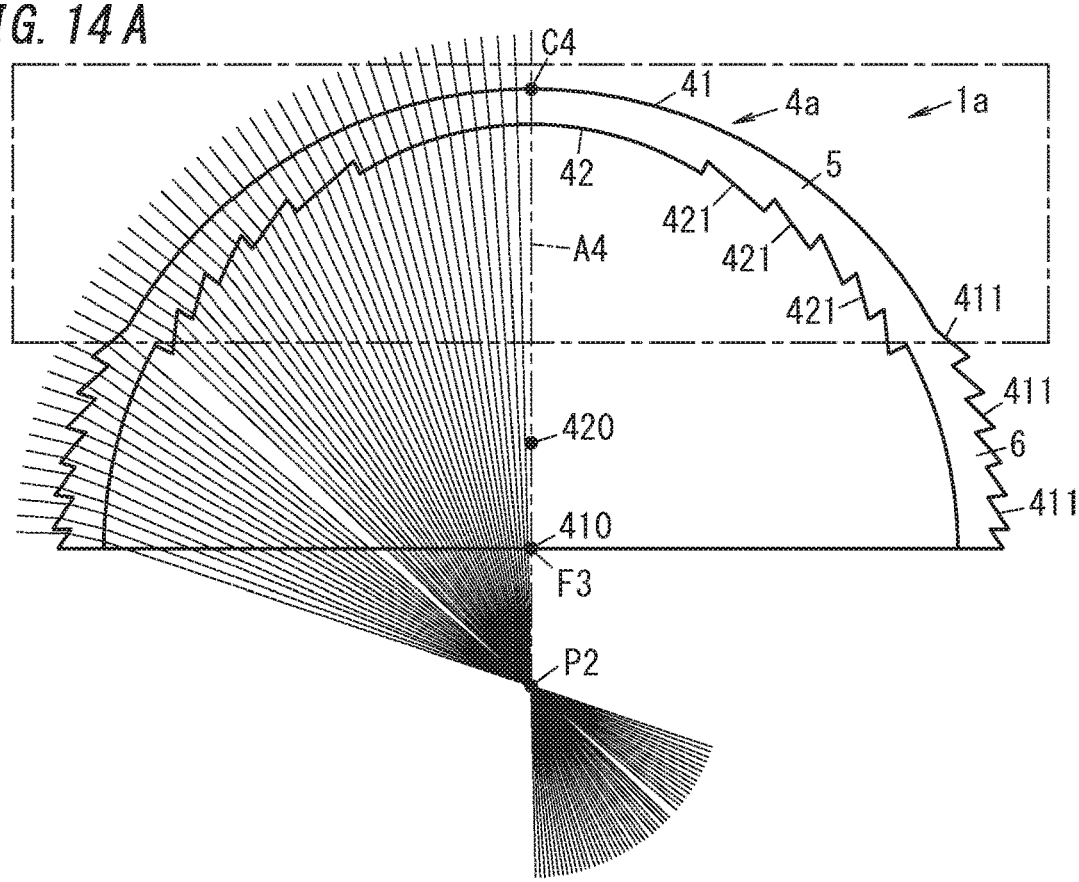
FIG. 14A illustrates a central portion of a meniscus lens in an infrared sensing device according to a second embodiment of the present invention.
Figure 14B:
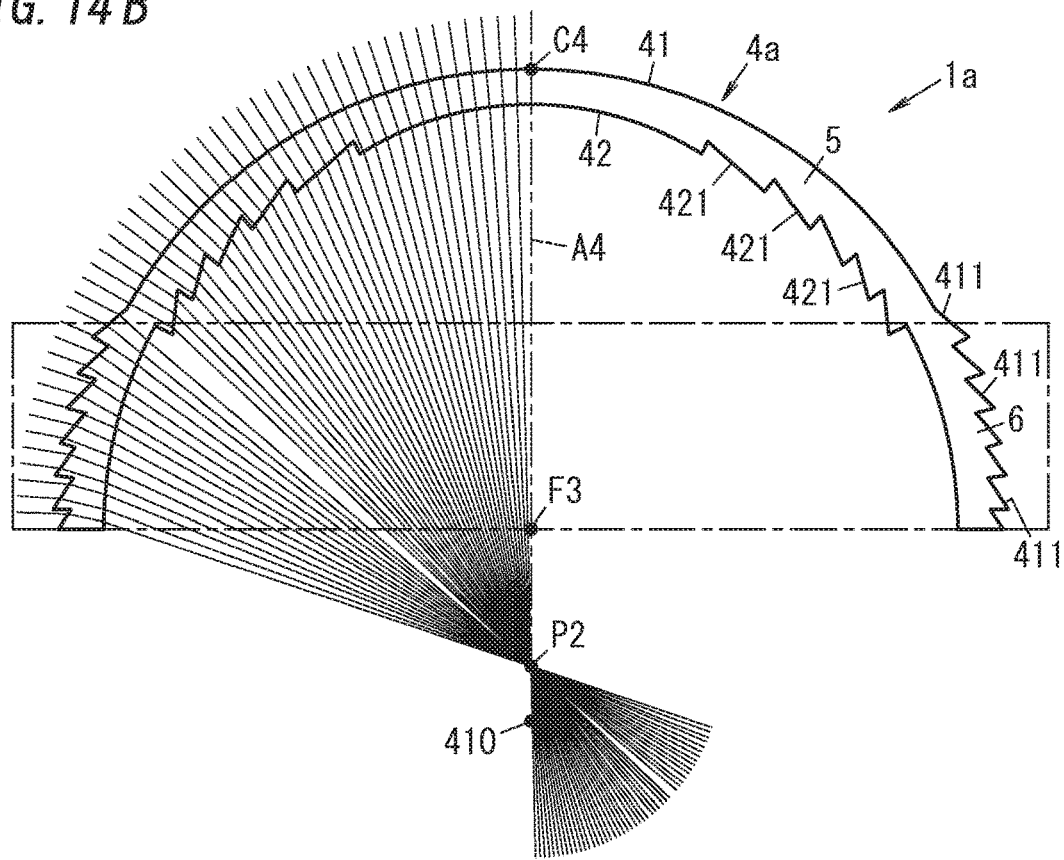
FIG. 14B illustrates a peripheral portion of the meniscus lens in the infrared sensing device.

In an infrared sensing device 1a according to a second embodiment, its meniscus lens 4a has a different shape as shown in FIGS. 14A and 14B from the meniscus lens 4 of the infrared sensing device 1 according to the first embodiment. In the other respects, the infrared sensing device according to the second embodiment has the same configuration as the infrared sensing device 1 according to the first embodiment, and therefore, description and illustration thereof will be omitted herein.

In the infrared sensing device 1a according to the second embodiment, the meniscus lens 4a has, on the second surface 42, a plurality of lens surfaces 421 which are concentric around the optical axis A4 of the meniscus lens 4a with respect to the central portion 5 as shown in FIG. 14A, and has, on the first surface 41, a plurality of lens surfaces 411 which are concentric around the optical axis A4 of the meniscus lens 4a with respect to the peripheral portion 6 as shown in FIG. 14B. Each of the plurality of lens surfaces 421 on the second surface 42 is tilted such that as a distance from the top point C4 increases in a direction parallel to the optical axis A4 of the meniscus lens 4a, a distance from the optical axis A4 to the lens surface 421 also increases accordingly. Alternatively, each of the plurality of lens surfaces 421 on the second surface 42 is parallel to the optical axis A4 of the meniscus lens 4a. Each of the plurality of lens surfaces 411 on the first surface 41 is tilted such that as a distance from the top point C4 increases in a direction parallel to the optical axis A4 of the meniscus lens 4a, a distance from the optical axis A4 to the lens surface 411 also increases accordingly.

This allows the infrared sensing device 1a according to the second embodiment to not only form the meniscus lens 4a by molding but also reduce aberrations. Note that in FIGS. 14A and 14B, the results of simulation representing the traveling path of the infrared ray are indicated by fine lines.

(Variations)

Note that the first and second embodiments described above are only exemplary ones of various embodiments of the present invention and should not be construed as limiting. Rather, those embodiments may be readily modified in various manners depending on a design choice or any other factor without departing from the scope of the present invention.

For example, the infrared sensing element 2 does not have to be a quad-type pyroelectric element but may also be a dual-type pyroelectric element or a single-type pyroelectric element. In addition, the shape, arrangement and other parameters of the sensing units 24 in the infrared sensing element 2 are not particularly limited, either.

Also, in the embodiments described above, the infrared sensing element 2 is implemented as a pyroelectric element for use in a current detection mode to output a current signal as its output signal. However, this is only an example of the present invention and should not be construed as limiting. Alternatively, the infrared sensing element 2 may also be a pyroelectric element for use in a voltage detection mode to output a voltage signal as its output signal. In that case, the current-voltage transformer circuit 71 of the signal processing unit 7 may be omitted.

Furthermore, the infrared sensing element 2 does not have to include the pyroelectric substrate 23 but may also be implemented as a chip including a detection unit formed by arranging a back surface electrode, a pyroelectric thin film, and a surface electrode in this order over an electrical insulating film on the surface of a silicon substrate.

Optionally, the infrared sensing device 1, 1a may also use, as its infrared sensing element, a thermopile, a resistance bolometer, or any other suitable device, instead of the pyroelectric element.

Optionally, in the lens array 3, each of the multiple lenses 30 may be configured as a Fresnel lens.

Furthermore, the window member 93 of the package 9 may be a semiconductor lens such as a silicon lens. Alternatively, the meniscus lens 4, 4a may be replaced with the window member 93 made of silicon and serving as the meniscus lens. In that case, a decline in sensitivity may be curbed even if the meniscus lens is not configured as a Fresnel lens, because silicon has higher infrared transmittance than polyethylene. Such a window member 93 serving as the meniscus lens may be formed by, for example, anodization technique.

Furthermore, in the infrared sensing device 1, 1a described above, the first member 11 includes a plurality of hooks 13 and the second member 12 has a plurality of holes 14. However, this is only an example of the present invention and should not be construed as limiting. Alternatively, the second member 12 may include a plurality of hooks 13 and the first member 11 may have a plurality of holes 14 so that the first member 11 and the second member 12 are integrated together.

Furthermore, in the infrared sensing device 1, 1a, the constituent elements of the signal processing unit 7 are housed in the package 9. However, this is only an example of the present invention and should not be construed as limiting. Alternatively, some or even all of the constituent elements of the signal processing unit 7 may be implemented outside of the package 9 (e.g., on a printed circuit board). In addition, the signal processing unit 7 is not an essential constituent element for the infrared sensing device 1, 1a.

The infrared sensing device 1, 1a, is able to focus the infrared ray while reducing aberrations, even if the shape of the lens array 3 is changed. Thus, when the sensing area is changed, only the shape of the lens array 3 needs to be changed with the design of the meniscus lens 4, 4a unchanged. Thus, there is no need to change the design of the meniscus lens 4, 4a depending on the intended use of the infrared sensing device 1, 1a, which may be installed on a room wall, a room ceiling, a hallway ceiling, or any of various other places. This contributes to cost reduction.

(Resume)

The embodiments and their variations described above disclose the following aspects:

An infrared sensing device (1; 1a) according to a first aspect includes an infrared sensing element (2), a lens array (3), and a meniscus lens (4; 4a). The lens array (3) includes multiple lenses (30). The lens array (3) is arranged to intersect with an optical axis (A2) of the infrared sensing element (2). The lens array (3) has a focus (F3) on the same side as the infrared sensing element (2). The meniscus lens (4; 4a) has a dome shape and is arranged between the lens array (3) and the infrared sensing element (2). The meniscus lens (4) has a first surface (41) facing the lens array (3) and a second surface (42) facing the infrared sensing element (2). The meniscus lens (4; 4a) has a central portion (5) and a peripheral portion (6). The central portion (5) includes a top point (C4) that is an intersection between the optical axis (A4) of the meniscus lens (4; 4a) and the first surface (41). The peripheral portion (6) includes an end (E4) of the first surface (41) of the meniscus lens (4; 4a). With respect to the central portion (5) of the meniscus lens (4; 4a), an aplanatic point (410) of the first surface (41) is located at the focus (F3) of the lens array (3). With respect to the peripheral portion (6) of the meniscus lens (4; 4a), an aplanatic point (420) of the second surface (42) is located at the focus (F3) of the lens array (3).

An infrared sensing device (1; 1a) according to the first aspect is able to curb a decline in sensitivity while broadening the sensing area.

In an infrared sensing device (1) according to a second aspect, which may be implemented in conjunction with the first aspect, the meniscus lens (4) is a Fresnel lens having, on the second surface (42), a plurality of lens surfaces (421) arranged concentrically around the optical axis (A4) of the meniscus lens (4). The first surface (41) has a larger radius of curvature in the peripheral portion (6) than in the central portion (5). Each of the plurality of lens surfaces (421) is tilted such that as a distance from the top point (C4) increases in a direction parallel to the optical axis (A4) of the meniscus lens (4), a distance from the optical axis (A4) to the lens surface (421) also increases accordingly. Alternatively, each of the plurality of lens surfaces (421) is parallel to the optical axis (A4) of the meniscus lens (4).

An infrared sensing device (1) according to the second aspect not only allows the meniscus lens (4) to be formed by molding but also reduces aberration.

In an infrared sensing device (1a) according to a third aspect, which may be implemented in conjunction with the first aspect, the meniscus lens (4a) has, on the second surface (42), a plurality of lens surfaces (421) arranged concentrically around the optical axis (A4) of the meniscus lens (4a) with respect to the central portion (5), and also has, on the first surface (41), another plurality of lens surfaces (411) arranged concentrically around the optical axis (A4) of the meniscus lens (4a) with respect to the peripheral portion (6). Each of the plurality of lens surfaces (421) on the second surface (42) is tilted such that as a distance from the top point (C4) increases in a direction parallel to the optical axis (A4) of the meniscus lens (4a), a distance from the optical axis (A4) to the lens surface (421) also increases accordingly. Alternatively, each of the plurality of lens surfaces (421) on the second surface (42) is parallel to the optical axis (A4) of the meniscus lens (4a). Each of the plurality of lens surfaces (411) on the first surface (41) is tilted such that as the distance from the top point (C4) increases in the direction parallel to the optical axis (A4) of the meniscus lens (4a), a distance from the optical axis (A4) to the lens surface (411) also increases accordingly.

An infrared sensing device (1a) according to the third aspect not only allows the meniscus lens (4) to be formed by molding but also reduces aberrations.

In an infrared sensing device (1; 1a) according to a fourth aspect, which may be implemented in conjunction with any one of the first to third aspects, materials for the lens array (3) include polyethylene, and materials for the meniscus lens (4) also include polyethylene.

An infrared sensing device (1; 1a) according to the fourth aspect contributes to cost reduction.

An infrared sensing device (1; 1a) according to a fifth aspect, which may be implemented in conjunction with any one of the first to fourth aspects, includes: a first member (11) including the lens array (3); and a second member (12) including the meniscus lens (4; 4a). The first member (11) and the second member (12) are integrated together.

An infrared sensing device (1; 1a) according to the fifth aspect allows the relative positioning accuracy between the lens array (3) and the meniscus lens (4; 4a) to be increased.

In an infrared sensing device (1; 1a) according to a sixth aspect, which may be implemented in conjunction with the fifth aspect, one member selected from the group consisting of the first member (11) and the second member (12) has a plurality of hooks (13), and the other member selected from the group consisting of the first member (11) and the second member (12) has a plurality of holes (14) corresponding one to one to the plurality of hooks (13). Each of the plurality of hooks (13) passes through a corresponding one of the plurality of holes (14) and is hooked on a region surrounding the corresponding hole (14) to make the first member (11) and the second member (12) integrated together.

An infrared sensing device (1; 1a) according to the sixth aspect allows the first member (11) and the second member (12) to be integrated together easily.

An infrared sensing device (1; 1a) according to a seventh aspect, which may be implemented in conjunction with the sixth aspect, further includes a package (9) that houses the infrared sensing element (2). The package (9) includes a window member (93). The window member (93) intersects with the optical axis (A2) of the infrared sensing element (2). The window member (93) transmits an infrared ray. The second member (12) includes: a cylindrical portion (120) surrounding the package (9); and a plurality of ribs (1201) spaced apart from each other along a circumference of the cylindrical portion (120) and protruding from an inner peripheral surface (1200) of the cylindrical portion (120). The plurality of ribs (1201) are in contact with a side surface of the package (9).

An infrared sensing device (1; 1a) according to the seventh aspect allows the relative positioning accuracy between the infrared sensing element (2), the window member (93), and the meniscus lens (4; 4a) to be increased.

In an infrared sensing device (1; 1a) according to an eighth aspect, which may be implemented in conjunction with the seventh aspect, the second member (12) includes a positioning protrusion (1204). The positioning protrusion (1204) protrudes from the inner peripheral surface (1200) of the cylindrical portion (120). The positioning protrusion (1204) abuts on one side, opposite from the meniscus lens (4; 4a), of the package (9).

An infrared sensing device (1; 1a) according to the eighth aspect allows the relative positioning accuracy between the infrared sensing element (2), the window member (93), and the meniscus lens (4; 4a) to be increased.

In an infrared sensing device (1; 1a) according to a ninth aspect, which may be implemented in conjunction with the seventh or eighth aspect, the package (9) includes a package body (90) and a projection (903). The package body (90) houses the infrared sensing element (2) and holds the window member (93). The projection (903) protrudes in such a direction as to intersect with the optical axis (A2) of the infrared sensing element (2) from one end, opposite from the window member (93), of the package body (90). The cylindrical portion (120) of the second member (12) has a groove (1203) in which the projection (903) is fitted on an end face (1202) opposite from the meniscus lens (4; 4a).

An infrared sensing device (1; 1a) according to the ninth aspect allows the relative positioning accuracy between the infrared sensing element (2), the window member (93), and the meniscus lens (4; 4a) to be increased.

In an infrared sensing device (1; 1a) according to a tenth aspect, which may be implemented in conjunction with any one of the first to ninth aspects, the infrared sensing element (2) is a pyroelectric element.

REFERENCE SIGNS LIST 1, 1a Infrared Sensing Device
2 Infrared Sensing Element
3 Lens Array
30 Lens
31 First Surface
32 Second Surface
4, 4a Meniscus Lens
41 First Surface
410 Aplanatic Point
411 Lens Surface
42 Second Surface
420 Aplanatic Point
421 Lens Surface
5 Central Portion
6 Peripheral Portion
9 Package
90 Package Body
903 Projection
93 Window Member
11 First Member
12 Second Member
120 Cylindrical Portion
1200 Inner Peripheral Surface
1201 Rib
1202 End Face
1203 Groove
13 Hook
14 Hole
A2 Optical Axis
A4 Optical Axis
C4 Top Point
E4 End

The invention claimed is:

1. An infrared sensing device comprising:
an infrared sensing element;
a lens array including multiple lenses, arranged to intersect with an optical axis of the infrared sensing element, and having a focus on the same side as the infrared sensing element; and
a meniscus lens having a dome shape, the meniscus lens being arranged between the lens array and the infrared sensing element and having a first surface facing the lens array and a second surface facing the infrared sensing element,
the meniscus lens having
a central portion including: a top point that is an intersection between the optical axis of the meniscus lens and the first surface; and an intersection between the optical axis of the meniscus lens and the second surface; and
a peripheral portion including an end of the first surface of the meniscus lens and an end of the second surface of the meniscus lens,
an aplanatic point of the first surface being located, with respect to the central portion of the meniscus lens, at the focus of the lens array,
an aplanatic point of the second surface being located, with respect to the peripheral portion of the meniscus lens, at the focus of the lens array.

2. The infrared sensing device of claim 1, wherein
the meniscus lens is a Fresnel lens having, on the second surface, a plurality of lens surfaces arranged concentrically around the optical axis of the meniscus lens,
the first surface has a larger radius of curvature in the peripheral portion than in the central portion, and
each of the plurality of lens surfaces is tilted such that as a distance from the top point increases in a direction parallel to the optical axis of the meniscus lens, a distance from the optical axis to the lens surface also increases accordingly, or
each of the plurality of lens surfaces is parallel to the optical axis of the meniscus lens.

3. The infrared sensing device of claim 1, wherein
the meniscus lens has, on the second surface, a plurality of lens surfaces arranged concentrically around the optical axis of the meniscus lens with respect to the central portion, and also has, on the first surface, another plurality of lens surfaces arranged concentrically around the optical axis of the meniscus lens with respect to the peripheral portion,
each of the plurality of lens surfaces on the second surface is tilted such that as a distance from the top point increases in a direction parallel to the optical axis of the meniscus lens, a distance from the optical axis to the lens surface also increases accordingly, or
each of the plurality of lens surfaces on the second surface is parallel to the optical axis of the meniscus lens, and
each of the plurality of lens surfaces on the first surface is tilted such that as the distance from the top point increases in the direction parallel to the optical axis of the meniscus lens, a distance from the optical axis to the lens surface also increases accordingly.

4. The infrared sensing device of claim 1, wherein
materials for the lens array include polyethylene, and
materials for the meniscus lens also include polyethylene.

5. The infrared sensing device of claim 1, comprising:
a first member including the lens array; and
a second member including the meniscus lens, wherein
the first member and the second member are integrated together.

6. The infrared sensing device of claim 5, wherein
one member selected from the group consisting of the first member and the second member has a plurality of hooks, and the other member selected from the group consisting of the first member and the second member has a plurality of holes corresponding one to one to the plurality of hooks, and
each of the plurality of hooks passes through a corresponding one of the plurality of holes and is hooked on a region surrounding the corresponding hole to make the first member and the second member integrated together.

7. The infrared sensing device of claim 6, further comprising a package that houses the infrared sensing element, wherein
the package includes a window member intersecting with the optical axis of the infrared sensing element and configured to transmit an infrared ray,
the second member includes:
a cylindrical portion surrounding the package; and
a plurality of ribs spaced apart from each other along a circumference of the cylindrical portion and protruding from an inner peripheral surface of the cylindrical portion, and
the plurality of ribs are in contact with a side surface of the package.

8. The infrared sensing device of claim 7, wherein
the second member includes a positioning protrusion protruding from the inner peripheral surface of the cylindrical portion and abutting on one side, opposite from the meniscus lens, of the package.

9. The infrared sensing device of claim 7, wherein
the package includes:
a package body housing the infrared sensing element and holding the window member; and
a projection protruding in such a direction as to intersect with the optical axis of the infrared sensing element from one end, opposite from the window member, of the package body, and
the cylindrical portion of the second member has a groove in which the projection is fitted on an end face opposite from the meniscus lens.

10. The infrared sensing device of claim 1, wherein
the infrared sensing element is a pyroelectric element.

11. The infrared sensing device of claim 2, wherein
materials for the lens array include polyethylene, and materials for the meniscus lens also include polyethylene.

12. The infrared sensing device of claim 3, wherein
materials for the lens array include polyethylene, and materials for the meniscus lens also include polyethylene.

13. The infrared sensing device of claim 2, comprising:
a first member including the lens array; and
a second member including the meniscus lens, wherein
the first member and the second member are integrated together.

14. The infrared sensing device of claim 3, comprising:
a first member including the lens array; and
a second member including the meniscus lens, wherein
the first member and the second member are integrated together.

15. The infrared sensing device of claim 4, comprising:
a first member including the lens array; and
a second member including the meniscus lens, wherein
the first member and the second member are integrated together.

16. The infrared sensing device of claim 13, wherein
one member selected from the group consisting of the first member and the second member has a plurality of hooks, and the other member selected from the group consisting of the first member and the second member has a plurality of holes corresponding one to one to the plurality of hooks, and
each of the plurality of hooks passes through a corresponding one of the plurality of holes and is hooked on a region surrounding the corresponding hole to make the first member and the second member integrated together.

17. The infrared sensing device of claim 14, wherein
one member selected from the group consisting of the first member and the second member has a plurality of hooks, and the other member selected from the group consisting of the first member and the second member has a plurality of holes corresponding one to one to the plurality of hooks, and
each of the plurality of hooks passes through a corresponding one of the plurality of holes and is hooked on a region surrounding the corresponding hole to make the first member and the second member integrated together.

18. The infrared sensing device of claim 15, wherein
one member selected from the group consisting of the first member and the second member has a plurality of hooks, and the other member selected from the group consisting of the first member and the second member has a plurality of holes corresponding one to one to the plurality of hooks, and
each of the plurality of hooks passes through a corresponding one of the plurality of holes and is hooked on a region surrounding the corresponding hole to make the first member and the second member integrated together.

19. The infrared sensing device of claim 16, further comprising a package that houses the infrared sensing element, wherein
the package includes a window member intersecting with the optical axis of the infrared sensing element and configured to transmit an infrared ray,
the second member includes:
a cylindrical portion surrounding the package; and
a plurality of ribs spaced apart from each other along a circumference of the cylindrical portion and protruding from an inner peripheral surface of the cylindrical portion, and
the plurality of ribs are in contact with a side surface of the package.

20. The infrared sensing device of claim 17, further comprising a package that houses the infrared sensing element, wherein
the package includes a window member intersecting with the optical axis of the infrared sensing element and configured to transmit an infrared ray,
the second member includes:
a cylindrical portion surrounding the package; and
a plurality of ribs spaced apart from each other along a circumference of the cylindrical portion and protruding from an inner peripheral surface of the cylindrical portion, and the plurality of ribs are in contact with a side surface of the package.

* * * * *